Aug. 28, 1928.

R. E. BRUCKNER 1,682,033

HIGH PRESSURE GAUGE CASING HAVING AN EXPLOSION VENT

Filed Sept. 15, 1927

INVENTOR
RUDOLPH E. BRUCKNER
BY Moses and Nolte
ATTORNEY

Patented Aug. 28, 1928.

1,682,033

UNITED STATES PATENT OFFICE.

RUDOLPH E. BRUCKNER, OF BAYSIDE, NEW YORK, ASSIGNOR TO NATIONAL GAUGE AND EQUIPMENT COMPANY, OF LA CROSSE, WISCONSIN, A CORPORATION OF DELAWARE.

HIGH-PRESSURE GAUGE CASING HAVING AN EXPLOSION VENT.

Application filed September 15, 1927. Serial No. 219,586.

This invention relates to gauges, and more particularly to the type thereof which is attached to oxygen tanks and other containers wherein high pressures are maintained.

The principal object of the invention is the provision of an improved form of safety closure for the gauge casing, which closure normally protects the gauge mechanism from ingress of dust and dirt, and which will, with certainty, operate to permit the escape of gases under abnormally high pressure, resulting, for example, from an explosion within the gauge.

In gauges employed in this class of work, the pressure-sensitive element is customarily of the Bourdon tube type. Where oxygen is stored under pressures as high as 2,000 pounds per square inch, explosions have many times occurred because of carelessness in permitting oil to get into the apparatus. The consequent instantaneous generation of gases under abnormally high pressure causes the Bourdon tube to rupture; and, in the absence of means for releasing the consequent pressure in the gauge casing, the entire gauge is violently shattered and persons in the vicinity are endangered by the flying fragments thereof. It has long been recognized that such gauges should be provided with a blow-out member which will function to relieve the casing of pressure immediately upon the rupture of the Bourdon tube, thus preventing the shattering of the gauge. It has heretofore been proposed to prevent shattering of the gauge casing under the hereinbefore described conditions by forming an aperture in the upper side of the cylindrical wall thereof; and to normally close this opening by means of an arcuate, overlapping cover. Devices of this type are, however, objectionable in that the ends of the cover are frequently bent, either accidentally in handling or purposely by persons curious to examine the gauge mechanism. Dust and dirt then enter the casing and clog the delicate working parts.

The present invention has for its principal object the provision of a simple, practical and efficient means for venting the gauge casing which overcomes the disadvantages above pointed out.

The following is a description of a safety release cover embodying the invention in the forms at present preferred; but it will be understood that various modifications and changes may be made without departing from the spirit of the invention and without exceeding the scope of the claims.

Figure 1:
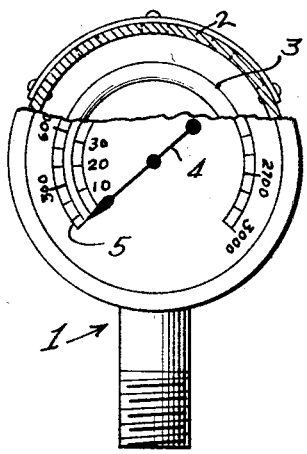
Figure 2:
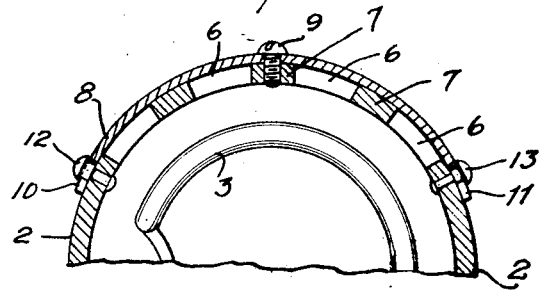
Figure 3:
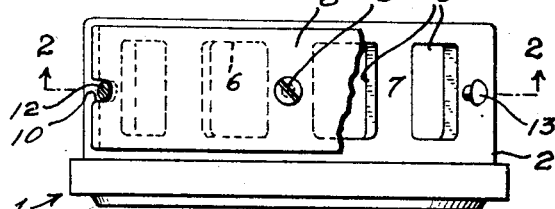
Figure 4:
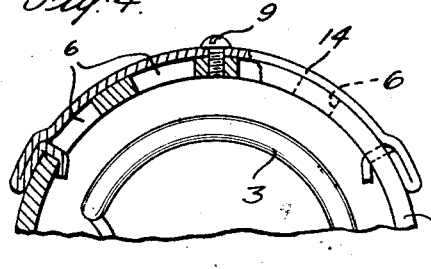
Figure 6:
Figure 6:
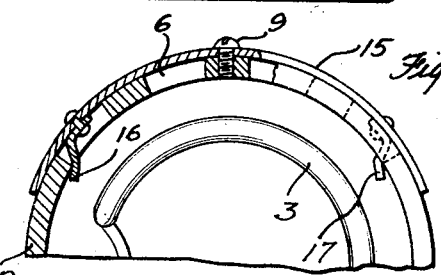
Figure 5:
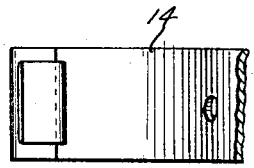
Figure 7:
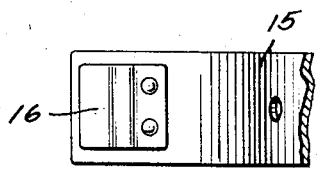

The invention will best be understood by reference to the accompanying drawings, wherein it is illustrated in its preferred forms, and in which Fig. 1 shows in front elevation a Bourdon tube gauge of conventional type, to which is attached one form of the invention—the upper portion of the gauge being broken away. Fig. 2 is a fragmentary detail, partly in front elevation and partly in section, on the line 2—2 of Fig. 3; Fig. 3 is a plan view of a gauge casing of a particular form employed in carrying out the invention, together with a coacting cover, also of a particular form—a portion of the cover element being broken away; Fig. 4 is a fragmentary detail showing, partly in section and partly in front elevation, a modified form of cover embodying the invention; Fig. 5 is a fragmentary detail of an end portion of the cover illustrated in Fig. 4, as viewed from the bottom of said Fig. 4; Fig. 6 is a fragmentary detail, partly in section and partly in front elevation, showing another modified form of cover embodying the invention; and Fig. 7 is a fragmentary detail, showing an end portion of the cover illustrated in Fig. 6, as viewed from the bottom of said Fig. 6.

Like reference characters indicate like parts throughout the drawings.

Referring to the drawings, 1 denotes a Bourdon tube pressure gauge, provided with a cup-shaped casing 2, containing a pressure-sensitive element in the form of a Bourdon tube 3, the distortion of which, under variations in pressure, actuates, by suitable mechanism (not shown) the pointer 4 over the dial 5. In the upper part of the cylindrical wall of the gauge casing are formed a plurality of vents 6, between which are bridges 7. In the form of the invention illustrated in Figs. 1, 2 and 3, a cover 8 of spring metal is employed. This cover is of such dimensions as to overlap the vents formed in the cylindrical portion of the gauge casing, and to therefore protect the mechanism of the gauge from ingress of dust and dirt. The cover is perforated at its center to permit of the passage therethrough of retaining screw 9, which is attached to the casing by screw-threads formed in the central bridge wall 7. Formed in the ends of the cover 8 are slots 10 and 11, slidably engaging, respectively, shouldered rivets 12 and 13, permanently seated in the main body of the cylindrical wall, slight clearance being provided between the heads of the rivets and the ends of the cover. The mode of operation of this form of the invention is as follows: With the cover attached to the casing by means of retaining screw 9, the ends of said cover are so shaped as to cause slots 10 and 11 to embrace the shoulder portions of rivets 12 and 13, respectively, such ends being thereafter held in position, under normal conditions, by engagement with the shouldered shank portions beneath the rivet heads. Upon the generation within the gauge of pressure so high as to rupture the Bourdon tube 3, the ends of the cover spring out of engagement beneath the rivet heads, permitting free and quick release of the pressure in the gauge casing. Due to the slight clearance beneath the rivet heads mentioned and the springy character of the metal of cover 8 the ends of the cover may be thus withdrawn upon comparatively slight excess of pressure within the casing. The cover is at all times attached to the casing by the retaining screws 9, and cannot be blown therefrom by the force of the explosion.

In the modified form of the invention illustrated in Figs. 4 and 5, the cylindrical wall of the casing is provided with vents and bridges similar in all respects to those shown in Figs. 1, 2 and 3. The cover 14 is attached at its center in the manner hereinbefore described in referring to cover 8. However, in this instance the ends of the cover, instead of being provided with slots, are folded backward upon themselves to form overlapping surfaces, and are again bent to form projections which, upon flexure of the cover ends, enter the outer of the four vents and engage the edges of the walls which define the extreme outer sides of such vents.

The further modified form of the invention shown in Figs. 6 and 7 differs from the hereinbefore described forms only in respect of the means provided for effecting closure engagement between the ends of the cover 15 and the cylindrical portion of the gauge casing. In this form of the device, substantially non-flexible, wing-like members 16 and 17 are riveted or otherwise attached to the cover near the ends thereof. Upon flexure of the cover ends, these members enter the outer of the four vents and engage the walls thereof in the same manner as has been described in referring to the corresponding elements of the device of Figs. 4 and 5.

It will be understood that upon rupture of the Bourdon tube by abnormally high pressure, the mode of operation is the same in all three forms of the invention.

The invention possesses the advantage of insuring that the ends of the cover are normally held in positive contact with the casing and against radial displacement. This prevents these ends being lifted, either accidentally or intentionally. On the other hand, when a sudden pressure is generated in the casing, the ends of the cover are easily released by being withdrawn from engagement with the casing in a more or less tangential direction, thus allowing escape of the internal pressure.

What I claim is:

1. In a gauge, the combination of a casing provided with safety vents, a flexible cover forming a closure for said vents, means for rigidly attaching said cover to the casing, and means for slidably retaining an end of said cover in contact with said casing.

2. In a gauge, the combination of a casing provided with safety vents, a flexible cover forming a closure for said vents, means for rigidly attaching said cover to the casing, and means holding an end of said cover against the casing permitting slidable release of said end but preventing radial displacement thereof.

3. In a gauge, the combination of a casing provided with safety vents, a flexible cover forming a closure for said vents, means for rigidly attaching said cover, said means being disposed centrally with respect to said vents, and means holding the ends of said cover against said casing permitting slidable release of said ends, but preventing radial displacement thereof.

4. In a gauge, a casing provided with vents, a closure for said vents comprising a cover having a slot in each end thereof, means for rigidly attaching said cover to said casing, and shouldered rivets with which each of said ends engages, and holding said ends in slidable contact with said casing.

5. In a gauge, the combination of a casing provided with safety vents, a flexible cover forming a closure for said vents, means for rigidly attaching said cover to the casing intermediate the ends of said cover, and means for slidably retaining the ends of said cover in contact with said casing.

6. In a gauge, the combination of a casing provided with safety vents, a flexible cover of resilient material forming a closure for said vents, means for rigidly attaching said cover to the casing intermediate the ends of said cover, and means holding the ends of said cover against the casing permitting slidable release of said ends but preventing radial displacement thereof.

In testimony whereof I have affixed my signature to this specification.

RUDOLPH E. BRUCKNER.